US012335407B2

(12) United States Patent
Sharma et al.

(10) Patent No.: US 12,335,407 B2
(45) Date of Patent: *Jun. 17, 2025

(54) SYSTEMS AND METHODS FOR USE IN PROVISIONING CREDENTIALS

(71) Applicant: MASTERCARD INTERNATIONAL INCORPORATED, Purchase, NY (US)

(72) Inventors: Prashant Sharma, Madison, NJ (US); Bryn Anthony Robinson-Morgan, Mosborough Village (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/595,316

(22) Filed: Mar. 4, 2024

(65) Prior Publication Data

US 2024/0205024 A1  Jun. 20, 2024

Related U.S. Application Data

(63) Continuation of application No. 18/128,983, filed on Mar. 30, 2023, now Pat. No. 11,956,373, which is a
(Continued)

(51) Int. Cl.
*H04L 9/32* (2006.01)
*G06F 21/44* (2013.01)
(Continued)

(52) U.S. Cl.
CPC ............ *H04L 9/3247* (2013.01); *G06F 21/44* (2013.01); *G06F 21/57* (2013.01); *H04L 9/3215* (2013.01);
(Continued)

(58) Field of Classification Search
CPC . H04L 9/3247; H04L 9/3215; H04L 63/0815; H04L 63/0861; H04L 63/0823;
(Continued)

(56) References Cited

U.S. PATENT DOCUMENTS

2014/0082088 A1* 3/2014 Ye .................... G06Q 50/01
                                                      709/204
2017/0346815 A1* 11/2017 Andrews ............. H04L 63/0853
(Continued)

*Primary Examiner* — Han Yang
(74) *Attorney, Agent, or Firm* — Harness, Dickey & Pierce, P.L.C.

(57) ABSTRACT

Systems and methods are provided for provisioning identity credentials based on interactions with verified or trusted users. One exemplary computer-implemented method includes receiving a request for a digital identity from a user, where the request includes identifying information for the user, and transmitting, to a verified user, an attestation request for the user. The method also includes receiving, from the verified user, an attestation response to the attestation request with regard to at least some of the identifying information for the user, generating the digital identity for the user based on a number of attestation responses of the identifying information for the user satisfying a threshold, and sharing a digital identity notice with the user including an identifier for the user, whereby the user is permitted to share the digital identity with a relying party via the identifier.

19 Claims, 4 Drawing Sheets

Related U.S. Application Data continuation of application No. 16/889,374, filed on Jun. 1, 2020, now Pat. No. 11,646,895.

(51) Int. Cl.
*G06F 21/57* (2013.01)
*H04L 9/40* (2022.01)

(52) U.S. Cl.
CPC ...... *H04L 63/0815* (2013.01); *H04L 63/0861* (2013.01)

(58) Field of Classification Search
CPC ...... H04W 12/069; G06F 21/44; G06F 21/57; G06F 21/31; G06F 21/32; G06F 21/33
See application file for complete search history.

(56) References Cited

U.S. PATENT DOCUMENTS

| | | | |
|---|---|---|---|
| 2019/0149539 A1* | 5/2019 | Scruby | H04L 63/083 713/168 |
| 2019/0199698 A1* | 6/2019 | Bryson | G06Q 20/3821 |
| 2019/0319808 A1* | 10/2019 | Fallah | H04L 9/3239 |
| 2020/0184482 A1* | 6/2020 | Sharma | G06Q 20/3278 |
| 2021/0377043 A1 | 12/2021 | Sharma et al. | |

* cited by examiner

SYSTEMS AND METHODS FOR USE IN PROVISIONING CREDENTIALS

CROSS-REFERENCE TO RELATED APPLICATIONS

This application is a continuation of U.S. patent application Ser. No. 18/128,983 filed Mar. 30, 2023, which is a continuation of U.S. patent application Ser. No. 16/889,374 filed Jun. 1, 2020, now U.S. Pat. No. 11,646,895 issued May 9, 2023. The entire disclosure of each of the above applications is incorporated herein by reference.

FIELD

The present disclosure is generally directed to systems and methods for use in provisioning credentials to target users, based on interactions with verifying or trusted users.

BACKGROUND

This section provides background information related to the present disclosure which is not necessarily prior art.

Identities of users are often required to be verified in order for the users to interact with different entities. For example, financial institutions typically require the identities of users to be verified prior to conducting business interactions with the users, whether that be allowing the users to withdraw funds from existing accounts or open new accounts. Such verification generally serves to protect the entities (e.g., the financial institutions) from loss, as well as from liability related to know-your-customer (KYC) requirements (e.g., related to anti-money laundering requirements, etc.). In connection therewith, the entities may rely on presentment of physical documents (e.g., driver's licenses, passports, government ID cards, etc. that include one or more identity attributes of the users), by the users, as means of verifying the users. It is further known for users to be associated with digital identities, whereby the users may be verified (e.g., assessed, authenticated, etc.) without being present (e.g., without being physically present at the entities) and/or without presenting physical documents to the entities. The digital identities, much like physical documents, include certain attributes about the users, and are issued by identity providers upon verification of the users.

BRIEF DESCRIPTION OF DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users are often associated with identities, to which the users are authenticated in connection with various activities, such as, for example, requesting or directing services (e.g., ride share services, healthcare services, travel services, telecommunication services, etc.), establishing accounts (e.g., bank accounts, retirement accounts, email accounts, etc.), etc. The identities may be verified in various manners, including by physical identifying documents (e.g., driver's licenses, passports, government ID cards, etc.), etc. When users lack appropriate physical identifying documents, though, it may be difficult for the users to engage in interactions with certain entities because the users may be designated as having un-verified identities.

Uniquely, the systems and methods herein permit for identities of users to be verified by one or more other verified (or trusted) users. In particular, in a given environment, multiple users may be associated with identities, where each of the users has previously been verified to a particular identity. In this manner, an entity may trust the identities of the verified users as sufficient to issue a payment account to the verified users, or to distribute funds to the users. Also, in the given environment, other users may be unverified with regard to the entity (i.e., associated with unverified identities and/or un-associated with physical documents sufficient to be verified with the entity). As such, the unverified users may solicit verification of one or more attributes of their identities from the verified users, whereby the verified users attest to the attributes and/or identities of the unverified users. When a sufficient number of verified users attest to the attributes and/or identities (and potentially based on scoring related to the same or other factors), the unverified users are verified and are permitted to interact with the entity as verified users. Consequently, unverified users are able to leverage verified users (and their interactions and/or relationships therewith) to be verified, whereby hurdles associated with lack of physical identifying documents to effect such verification, for example, may be overcome.

Figure 1:
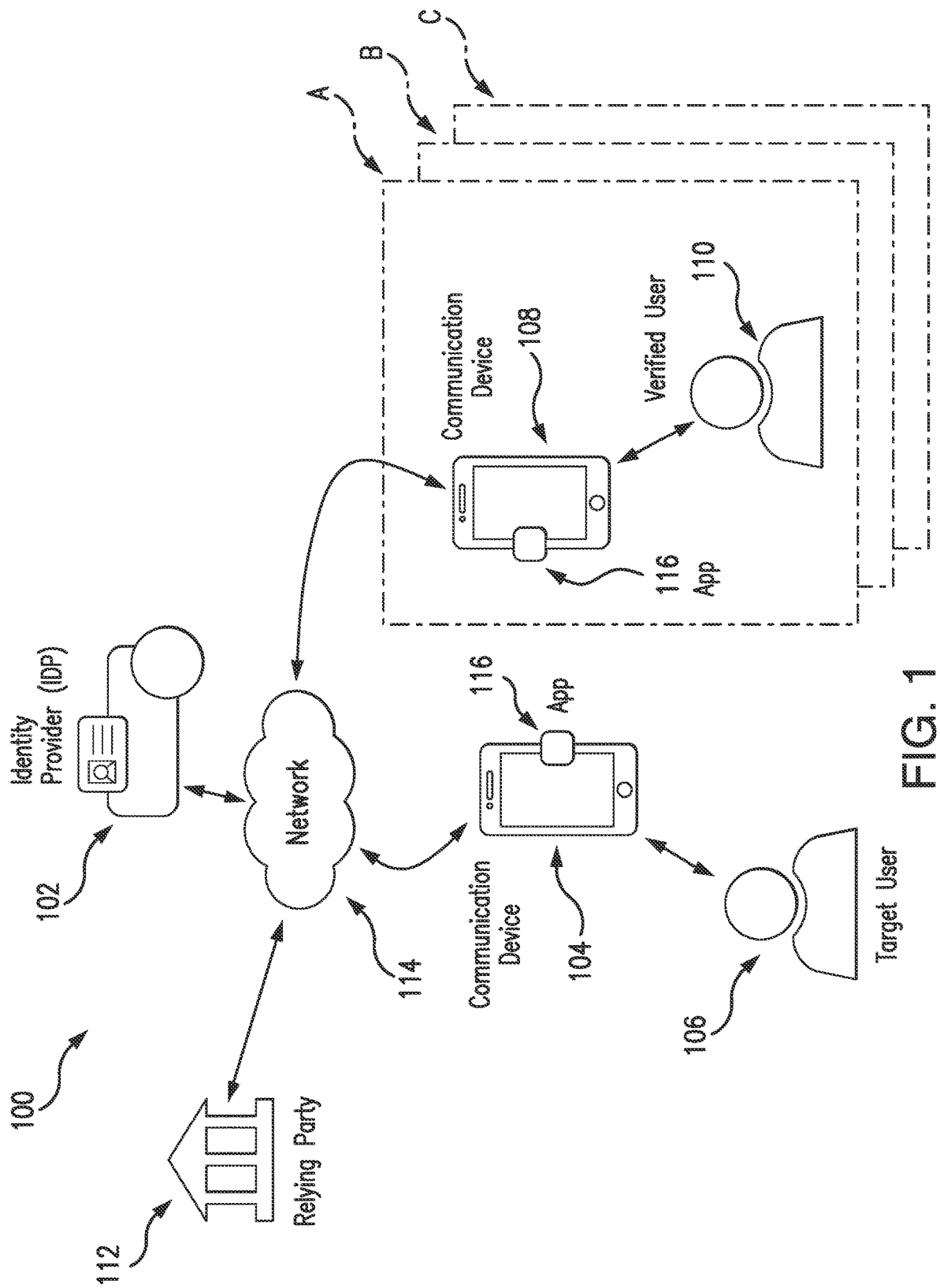
FIG. 1 illustrates an exemplary system of the present disclosure suitable for use in provisioning identity credentials to target users, based on interactions with verified or trusted users.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users, platforms for identity services, privacy concerns and/or requirements, etc.

The illustrated system 100 generally includes an identity provider (IDP) 102, a communication device 104 associated with a target user 106, a communication device 108 associated with a verified user 110, and a relying party 112, each of which is coupled to network 114. The network 114 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 114 may include multiple different networks, where one or more of the multiple different networks are then accessible to particular ones of the IDP 102, the communication devices 104 and 108, and/or the relying party 112.

The IDP 102 in the system 100 generally is associated with forming and/or managing digital identities associated with users (e.g., the target user 106, the verified user 110, etc.). In connection therewith, the IDP 102 is configured to participate in registering, provisioning, and storing (in secure memory) identity information (or attributes) associated with the users, which may then be provided to one or more relying parties (such as the relying party 112) upon approval by the corresponding users. As such, the IDP 102 is configured to employ various techniques to verify any identifying information supposedly associated with a user, prior to storing the identifying information and/or provisioning a digital identity for the user. Consequently, when the identifying information is provided to the relying party 112, for example, from the IDP 102, the relying party 112 is permitted to trust the identifying information received for the user, thereby relying on the provisioning processes of the IDP 102.

In this exemplary embodiment, the IDP 102 is configured to classify a user into one of two categories: a verified user category and an unverified user category. When the user is classified as verified, the user is associated with a digital identity. However, when the user is classified as unverified, further verification is required in order for the user to be reclassified as verified.

The communication devices 104 and 108 in the illustrated system 100 each include a portable communication device such as, for example, a tablet, a smartphone, a personal computer, etc. What's more, each of the communication devices 104 and 108 also includes a network-based application 116, which configures the respective one of the communication devices 104 and 108 to communicate with the IDP 102. In the illustrated embodiment, the application 116 is provided by and/or associated with the IDP 102, as a standalone application. Alternatively, the application 116 may be provided as a software development kit (SDK) for integration in another application with one or more different purposes (e.g., as part of a financial application, an email application, a social-network application, a telecommunication application, a health application, etc.), whereby the SDK is provided by and/or associated with the IDP 102 and configures the communication devices 104 and 108 to interact with the IDP 102.

In addition, each of the users 106 and 110 is associated with an identity. The identities may include, without limitation, one or more of a name, a pseudonym, a mailing address, a billing address, a government ID number, an email address, a phone number, a birthdate, a place of birth, biometric references (e.g., facial images, etc.), gender, age, eye color, height, weight, hair color, account number(s), insurance identifier(s), an employee identifier, and/or other information (broadly, attributes) sufficient to distinguish the users 106 and 110 from other users, etc. Further, it should be appreciated that a relationship of some type exists between the target user 106 and the verified user 110, whether it include a legal relationship, a social relationship, a business relationship, or otherwise. For example, the relationship between the target user 106 and the verified user 110 may be one of parent/child (or vice versa), employer/employee, familial, friends, or other suitable relationship, etc. In this manner, the verified user 110 is familiar with the identity of the target user 106 such that the verified user 110 is able to verify or attest to the identity (or one or more attributes thereof) of the target user 106, as described further below.

In this exemplary embodiment, the identity of the verified user 110 may be evidenced by one or more physical documents issued by an authority (e.g., a federal government (e.g., a passport, a social security card, etc.), an insurance provider, a telecommunication provider (e.g., a mobile network operator (or MNO), etc.), a department of motor vehicles (or DMV), or other trusted identity authority, etc.). Conversely, the identity of the target user 106 is not evidenced by one or more physical documents. In addition, the verified user 110 and the communication device 108 associated with the user 110 are illustrated within dotted box A. Additional verified users (and corresponding communication devices) are included in the system 100 in dotted boxes B and C. More specifically, the illustrated system 100 includes three verified users and associated communication devices. It should be appreciated, however, that other system embodiments may include more or less combinations of verified users and associated communication devices, etc.

The relying party 112 in the system 100 includes a company, a business or other entity through which services, accounts, etc. are offered to users, such as, for example, the target user 106, etc. For example, the relying party 112 may include a financial institution, which offers banking services, such as payment accounts, etc. In another example, the relying party 112 may include a provider of healthcare (e.g., a physician, a medical service provider (e.g., associated with dialysis, chemotherapy, etc.), hospice care, an emergency room, etc.), which permits users to make appointments, view and pay bills, view test results, communicate with providers, etc. based on identities of the users, etc. That said, it should generally be appreciated that the relying party 112 may be any entity which relies on the identity of a user to deliver any kind of access, services, etc., to the user.

While only one IDP 102, two communication devices 104 and 108, two users 106 and 110, and one relying party 112 are illustrated in the system 100, it should be appreciated that additional ones of these parts may be included in other system embodiments. Specifically, for example, it should be appreciated that other system embodiment will include multiple other users (including both target users and verified users), etc.

Figure 2:
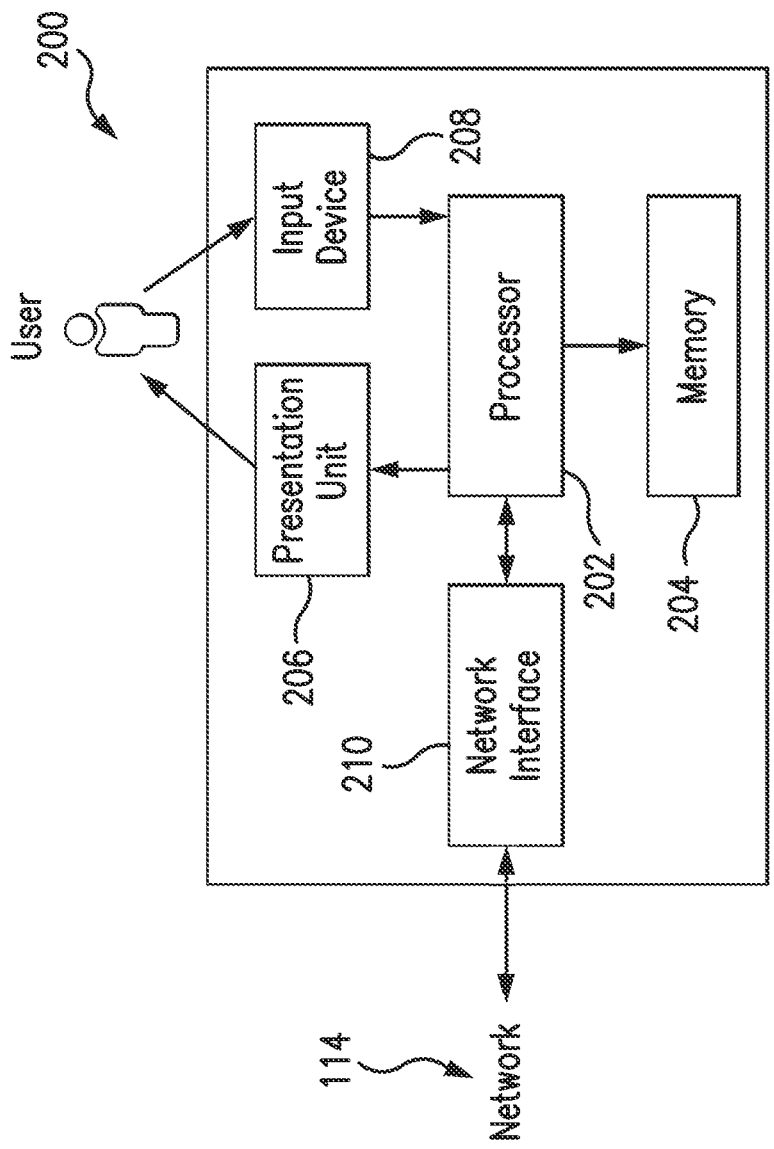
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102, the communication devices 104 and 108, and the relying party 112 may be considered, may include, and/or may be implemented in a computing device consistent with the computing device 200, coupled to (and in communication with) the network 114. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data (broadly, attributes) related to identities of users, contact information, attestations, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to attest to an identity of a target user, etc.), etc. And, various interfaces (e.g., as defined by the application 116, etc.) (e.g., interface 400, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, attestation of an identity of a target user, etc., in response to prompts from one or more interfaces, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein (e.g., network 114, etc.) and/or with other devices described herein. Further, in some exemplary embodiments, the computing device 200 may include the processor 202 and one or more network interfaces incorporated into or with the processor 202.

Referring again to FIG. 1, as described above, the system includes the target user 106 and the verified user 110 (and other verified users at boxes B and C). As the name suggests, the verified user 110 in this exemplary embodiment is already verified by the IDP 102 (e.g., and, thus, may be considered trusted by the IDP 102 and included in a network of trusted users by the IDP 102; etc.). Specifically, the verified user 110 has previously presented one or more physical identifying documents to the IDP 102, either in person or electronically (directly or indirectly), in manner sufficient to convince the IDP 102 that a specific identity alleged by the user 110 is actually associated with the user 110. For example, the verified user 110 may have provided an image of a physical document (which includes an image of the user), and also a facial image of the user 110 (e.g., a selfie taken by the user 110, a photograph taken by a third party, etc.) (e.g., where the facial image is also confirmed as a live image, etc.), thereby permitting the IDP 102 to verify the facial image, against the image of the user in the physical document, to thereby verify that the user 110 is actually associated with the identity alleged by the user 110. In connection therewith, the image of the user 110 included in the physical document (and used to verify the user 110) may be obtained from a printed image of the document, from electronic storage on or associated with the document (e.g., from an NFC chip associated with the document, etc.), or from an electronic data source of the issuer of the document (e.g., from a database associated with (e.g., maintained by, etc.) the issuer of the document (e.g., a facial image of the user 110 maintained at the Passport Office, etc.), etc.), etc. In the end, the IDP 102 is confident then that the verified user 110 is indeed associated with the presented identity. It should be appreciated that the IDP 102 may rely on a variety of different data flows to gain confidence that the user 110 is indeed associated with the identity presented (beyond or as an alternative to the above presentment of the physical document and corresponding image of the user 110).

Conversely, the target user 106 is initially an un-verified user, whereby the user 106 has not been subject to verification yet, or lacks the physical documents or other content to be confidently verified by the techniques employed by the IDP 102, in order to classify the user 106 as a verified user. In connection therewith, in interacting with the relying party 112 for one or more reasons, the user 106 may implement features of the present disclosure to verify their identity to the relying party 112. Such interactions with the relying party 112 may include, for example, the user 106 making a claim of their identity to the relying party 112 (e.g., where the relying party 112 includes a government department, etc.) in seeking entitlement to a benefit from the relying party 112, the user 106 making a claim of an association to a postal address to the relying party 112 (e.g., where the relying party includes a retailer, etc.) for shipment of goods, or the user 106 making a claim of being over an age threshold to the relying party 112 (e.g., where the relying party includes a merchant, etc.) in return for concessionary pricing, etc.

As such, for the target user 106 to become a verified user at the IDP 102, the target user 106 accesses the application 116, at the communication device 104, and opts to be verified by the community of verified users (e.g., the users in boxes A-C in the illustrated system 100, etc.). In response, the communication device 104, as configured by the application 116, solicits identifying information from the user 106 (e.g., a name, address, government ID number, email address, phone number, an image and/or selfie of the target user 106, etc.). It should be appreciated that the variety of identifying information provided by the target user 106 may vary from implementation to implementation, and is not limited to the examples identified above. The target user 106 then provides the solicited identifying information, or part thereof, to the application 116 at the communication device 104. In addition to the identifying information, the communication device 104, as configured by the application 116, also solicits identifiers for one or more verified users from which to solicit an attestation of the identity of the target user 106 (e.g., of the identifying information provided by the target user 106, etc.). The identifiers may include, for example, email addresses, phone numbers, etc., which are specific to the identified verified users (and may be used to identify the verified users). The target user 106, in turn, provides the identifiers to the application 116 at the communication device 104. It should be appreciated that, in at least one embodiment, the communication device 104, as configured by the application 116, retrieves verified user identifiers for verified users having specific criteria consistent with the verification request of the target user 106 (e.g., in a specific region of the target user 106, affiliated with a particular group or person, etc.) and presents the same to the target user 106 (at the communication device 104), whereby the target user 106 may then select one or more of the presented verified users. The target user 106, as above, then selects the verified users known to the target user 106, or more broadly, provides the identifiers associated with the selected verified users.

In response to the above, the communication device 104 of the target user 106, as configured by the application 116, transmits the identifying information and the identifiers of the selected (or identified) verified users to the IDP 102.

The IDP 102 is configured to store the identifying information received from the target user 106 in association with an identifier for the target user 106 (e.g., a phone number, an application ID for the application 116 at the communication device 104, an email address, a generated identifier, etc.). In addition, the IDP 102 is configured to identify the verified user 110, for example, as selected by the target user 106, based on the identifier(s) provided by the target user 106 and to solicit an attestation for the target user 106 from the verified user 110 at the communication device 108. In particular, the IDP 102 is configured to transmit an attestation request to the communication device 108, which, in turn, is configured, by the application 116, to display the attestation request to the verified user 110. The attestation request, generally, includes portions of the identifying information for the target user 106 (as provided by the target user 106), including, for example, an image and/or selfie of the target user 106, etc. When the verified user 110 selects the request, the communication device 108, as configured by the application 116, initially authenticates the verified user 110 (e.g., by PIN, biometric, etc.). When successful, the communication device 108, as configured by the application 116, then permits the verified user 110 to view and verify the identifying information of the target user 106, or, potentially, to select portions of the identifying information that the verified user 110 is able to verify. For example, the verified user 110 may be able to attest to a street address of the target user 106, but not a birthdate. The communication device 108, as configured by the application 116, in turn submits the verification of the verified user 110 to the IDP 102.

It should be appreciated that the IDP 102 may be configured to transmit the attestation request to each of the verified users identified by the target user 106, or potentially, sequentially, until a desired number of verified users have verified the identifying information of the target user 106. In addition, the IDP 102 may be configured to transmit the actual identifying information to be verified to the verified user 110. Or, the IDP 102 may transmit an indication that an address of the target user 106 is to be verified and, solicit the verified user 110 to provide the address of the target user 106. The IDP 102 may then compare the address received from the verified user 110 to the address provided by the target user 106 in order to verify the same (whereby the identifying information of the target user 106 is not actually provided to the verified user 110, but he verified user 110 may still participate in verifying the target user 106).

With the verification(s) (including the attestation from the verified user 110), the IDP 102 is configured to generate a digital identity for the target user 106 based on the verified user(s) verifying the identifying information about the target user 106. In connection therewith, the IDP 102 may be configured to generate a verification score for the target user, based on the verification(s) from the verified user(s) regarding the identifying information about the target user 106, whereby the digital identity is generated when the verification score satisfies a threshold. Or, the IDP 102 may be configured to generate the digital identity when a threshold number of verified user(s) verify the identifying information (or portion thereof) about the target user 106. For instance, in one example implementation of the system 100, six verified users may be required to establish (or verify) identifying information for the target user 106. As such, the IDP 102 may be configured to continue to transmit attestation requests to verified users until, for each portion of the identifying information, the information is verified by six verified users. As such, the later verified users may only be asked to verified un-verified identifying information. Here, when the first six verified users verify the name, address and phone number of the target user 106, but only three of the verified users are able to verify a birthdate, subsequent attestation requests may only ask the verified users to verify the birthdate.

The target user 106, once verified by the verified user 110 (and potentially others), then receives an identity token (e.g., from the IDP 102, etc.) associated with the digital identity stored at the IDP 102. The target user 106 is then permitted to share the identity token with the relying party 112, in connection with interactions with the relying party 112 requiring verification of the identity of the target user 106. The relying party 112 is configured, in turn, to redeem the identity token with the IDP 102, whereupon the IDP 102 is configured to provide the identifying information included in the digital identity for the target user 106 (or verify or confirm the same without actually providing such identifying information), to the relying party 112 (with assurances that the identifying information is verified, to an extent). The relying party 112, in turn, is configured to rely on the identifying information in its interactions with the target user 106 (based on the assurance, for example, from the IDP 102).

In addition to the above, it should also be appreciated that the IDP 102 may be configured to associate the digital identity of the target user 106 with an assurance level that may be lower than those associated with digital identities of users based on verification of physical documents. As such, for such users, the IDP 102 may be configured to only provide the digital identities or confirm information contained in the digital identities for lower impact activities (or low impact requests), such as, for example, opening loyalty accounts, making claims of associations to postal addresses for shipments of goods, or making claims of being over certain age thresholds in return for concessionary pricings, but not for opening payment accounts or credit accounts, or for making claims to entitlement to benefits from certain agencies or entities, etc.

Figure 3:
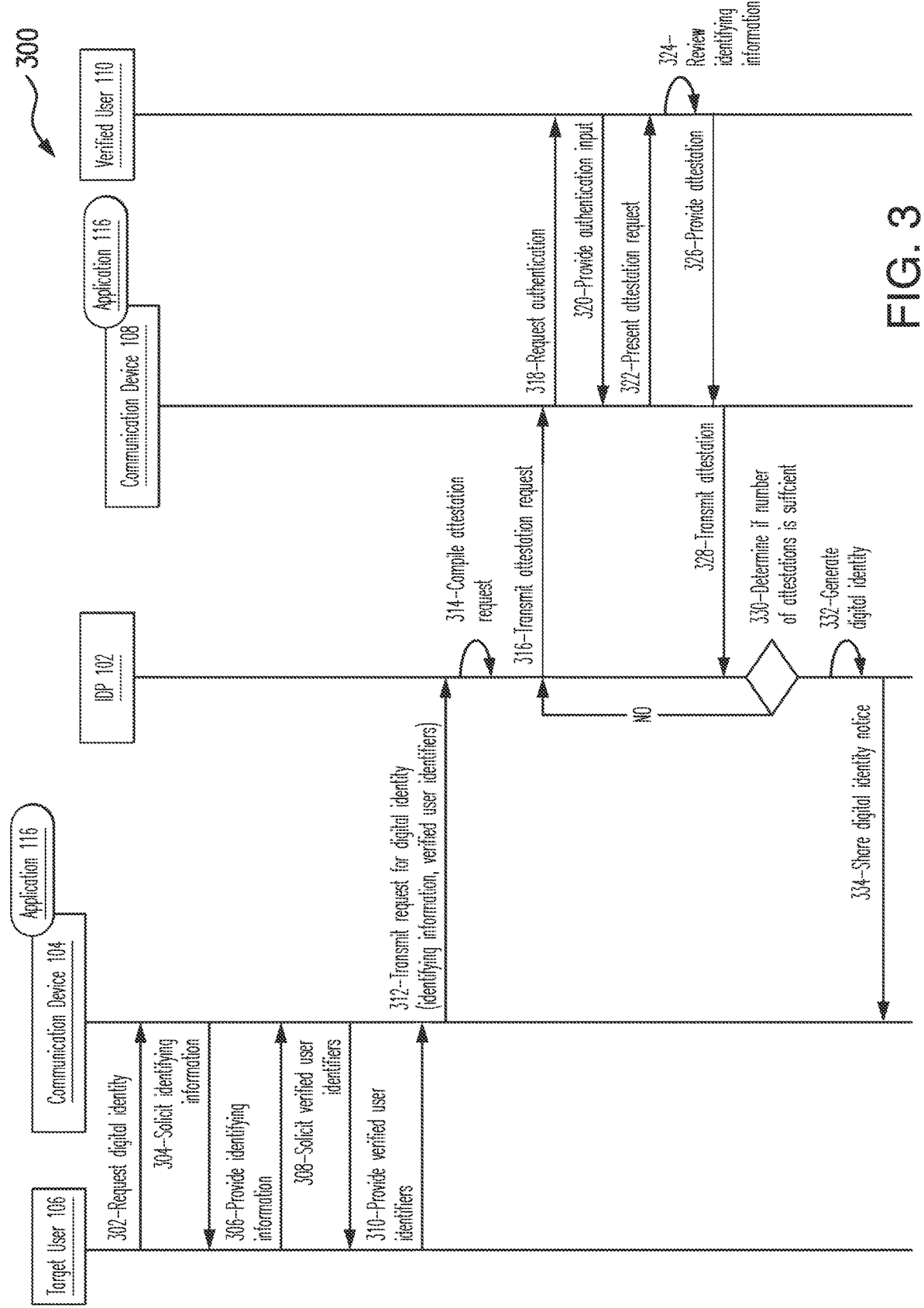
FIG. 3 illustrates an exemplary method, which may be implemented in connection with the system of FIG. 1, for provisioning identity credentials to a target user, based on interactions with verified or trusted users.

FIG. 3 illustrates an exemplary method 300 for use in provisioning identity credentials based on interactions with verifying or trusted users. The exemplary method 300 is described as implemented in system 100, with reference to the IDP 102, the communication devices 104 and 108, and the application 116, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

Initially, as explained above, the verified user 110 (and other verified users (e.g., in boxes B and C in FIG. 1, etc.) are already verified to the IDP 102 (i.e., they have already verified their identities with the IDP 102 based on conventional verification processes as described above). In connection therewith, the IDP 102 has a sufficient level of assurance in the identities of the verified users (including the user 110) (e.g., based on the manner in which the users were verified, etc.) to permit the verified users to verify another user. For example, in at least one implementation, the IDP 102 may require physical-document verification of an identity of a user in order to have a sufficient level of assurance in his/her identity to allow him/her to participate in verifying other users, etc.

At the outset in the method 300, then, the target user 106 wishes to have a digital identity, and potentially, to share the digital identity with the relying party 112. But, the target user 106 does not have physical documents sufficient to provide a required level of assurance to the IDP 102 to provide the digital identity. As such, by way of the present disclosure, target user 106 downloads and installs the application 116 at the communication device 104. The target user 106 then accesses the application 116, at the communication device 104, and request, at 302, in the application 116, to form a digital identity with the IDP 102. In so doing, the target user 106 specifically requests to form the digital identity with verified users, since the target user 106 does not possess a driver's license or other physical identifying document sufficient for the IDP 102 to verify the identity of the target user 106 by conventional means, etc.

In response to the request, the communication device 104, via the application 116, solicits, at 304, identifying information from the target user 106. The identifying information may include, without limitation, a name of the user 106, a mailing address, an email address, a phone number, a government ID number (e.g., a social security number, etc.), a birthdate, a birth place, a gender, an ethnicity, etc. The identifying information also includes, in this exemplary embodiment, an image (e.g., a selfie or other photograph, etc.) of the target user 106. In turn, at 306, the target user 106 provides the identifying information to the communication device 104. This may include manually typing the information into fields of one or more interfaces displayed by the application 116, at the communication device 104, and/or selecting the information from a pulldown or other listing of information, etc. Regarding the image, the target user 106 may direct a camera input device of the communication device 104 to his/her face and select to capture a selfie, thereby providing the image (in the form of the selfie) to the application 116.

After the identifying information is provided, or in connection therewith or prior, the communication device 104 solicits, at 308, identifiers for one or more verified users with whom the target user 106 is associated (whereby the verified users may be familiar with one or more aspects of the target user's identity). The verified user identifiers may include phone numbers, email addresses or other suitable identifiers associated with the verified user(s) (and known to the target user 106). In response, the target user provides, at 310, the verified user identifiers. In this exemplary embodiment, the target user 106 provides, at the least, a phone number or email address for the verified user 110. That said, it should be appreciated that this information may also be obtained via a peer-to-peer interaction, for example, invoked by the target user 106 directly with the verified user 110, whereby the target user 106 may obtain the necessary verified user identifier(s) directly from the verified user 110, etc.

Upon receipt of the identifying information and the verified user identifier(s), the communication device 104 (via the application 116) transmits, at 312, a request for a digital identity to the IDP 102. The request includes, without limitation, the identifying information for the target user 106 and the verified user identifier(s) for the selected verified users (including user 110), and potentially additional information captured from the communication device 104 (by the application 116) (e.g., an electronic serial number (ESN), a universally unique identifier (UUID), a globally unique identifier (GUID), an application ID, or other identifier specific to the communication device 104, etc.).

Upon receipt, the IDP 102 notes that the request does not include an image of a physical document or any suggestion of the availability of such a physical document for the target user 106, and/or that the request includes a specific request for verification of the target user 106 by other verified users, whereby the IDP 102, at 314, compiles an attestation request. The attestation request includes the image of the target user 106 (broadly, a facial image) and at least a portion of the identifying information for the target user 106 (as included in the request received from the communication device 104). For example, the attestation request may include a name of the target user 106, a mailing address, an email address, a phone number and a birthdate, but may exclude a government ID number of other confidential information, etc. It should be appreciated that other permutations of identifying information may be included in the attestation request, depending, potentially, on the privacy of the target user 106, a relation between the target user 106 and the particular verified user, etc. Regardless, once compiled, the IDP 102 identifies one or more verified users, including the verified user 110, based on the verified user identifiers included in the request from the target user 106, and transmits, at 316, the attestation request to at least the verified user 110 (at the communication device 108 as identified as being linked to the verified user 110 at the IDP 102). It should be appreciated that the number of verified users to which the IDP 102 transmits the attestation request may vary, from one or a few to a dozen or more or less. It should further be appreciated that the attestation request may be transmitted to verified users in stages (e.g., transmitted to ten verified users, and then to an addition five verified users if a sufficient number of attestation responses is not received; etc.), as described below.

The communication device 108 (of the verified user 110) receives the attestation request, and in turn, requests, at 318, authentication of the verified user 110. The request may include (or may invoke at the communication device 108, via the application 116) a request for a PIN or password, or may be a request for a biometric (e.g., a fingerprint, a selfie, etc.) to authenticate the user 110 (prior to sharing any further information about the target user 106 with the user 110). The verified user 110 then provides, at 320, an authentication input consistent with the request to the communication device 108. In turn, the communication device 108 authenticates the verified user 110 by comparing the authentication input to a reference stored in the communication device 108 (or stored at the IDP 102, through communication with the IDP 102, etc.), and determines the verified user 110 is authenticated based on a sufficient match of the authentication input to the reference (e.g., within industry standards, etc.). Once authenticated, the communication device 108 presents, at 322, the attestation request to the verified user 110 (e.g., via the application 116, etc.).

Figure 4:
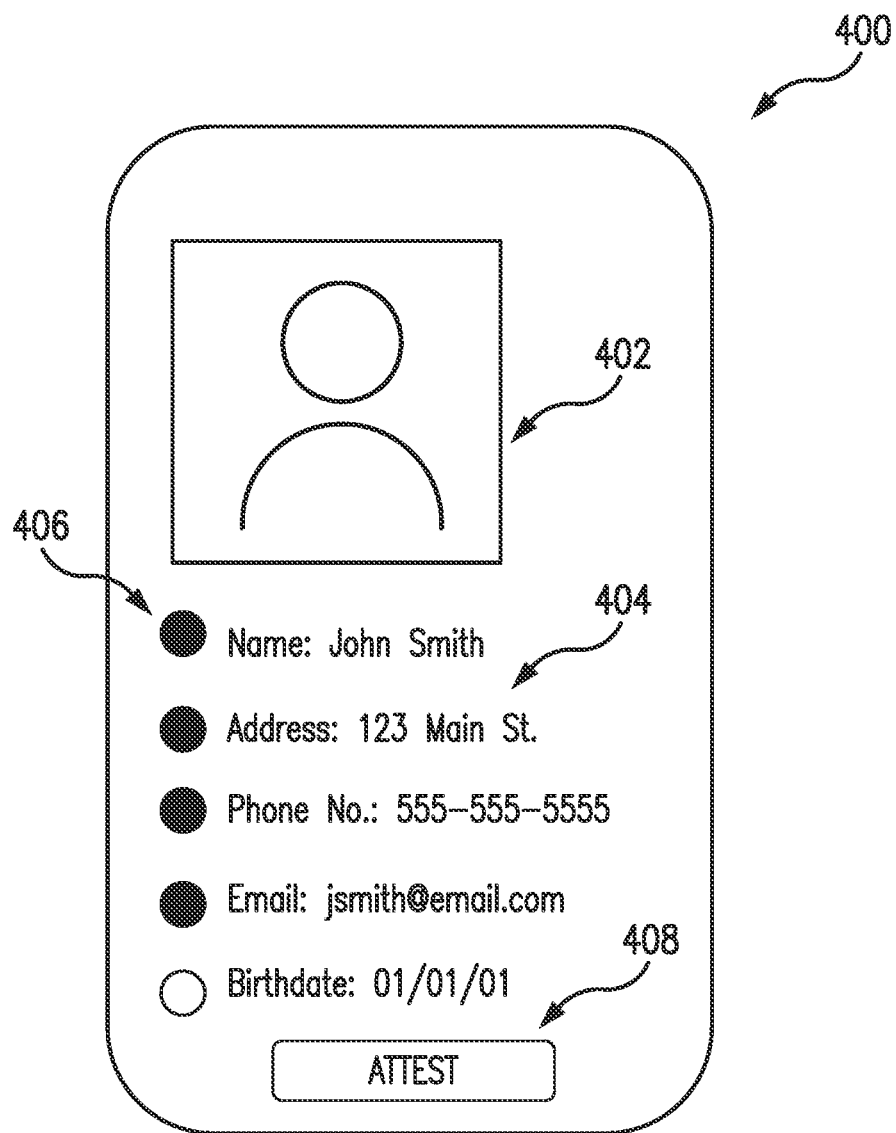
FIG. 4 illustrates an exemplary interface that may be displayed to a verified or trusted user in connection with attesting to one or more identity attributes of a target user, as part of providing identity credentials to the target user in the system of FIG. 1 and/or the method of FIG. 3.

FIG. 4 illustrates an exemplary attestation request interface 400, which may be displayed to the verified user 110 at the communication device 108. The interface 400 includes the image 402 of the target user 106, thereby permitting the verified user 110 to recognize the target user 106. The interface 400 also includes the identifying information for the target user 106, at 404 (i.e., a name, an address, a phone number, an email address, and a birthdate). It should be noted that although the target user 106 may have provided a social security number, it is not included in the identifying information 404, to, for example, preserve the privacy of the target user 106 (while still seeking to verify the target user 106).

Then in the method 300, upon viewing the interface 400, for example, the verified user 110 reviews, at 324, the identifying information of the target user 106 to determine which information the verified user 110 can attest to, and which information he/she cannot. In connection therewith, the interface 400 includes radio buttons 406, which may be selected or unselected by the verified user 110 to designate which information is attested to and/or verified. As shown in the example of FIG. 4, the verified user 110 has attested to the name, address, phone number and email of the target user 106, but not the birthdate. And, when the selections are completed, the verified user 110 selects the "Attest" button 408. In so doing, the verified user 110 provides, at 326, attestation to the selected identifying information for the target user 106 (e.g., for the identifying information for which the radio buttons 406 are selected in the interface 400, etc.). Thereafter, the communication device 108, in response, provides the attestation from the verified user 110 to the IDP 102, at 328.

It should be appreciated that operations 316 through 328 of the method 300 are completed (or performed) for each of the verified users for which a verified user identifier is provided and/or as determined by the IDP 102. As such, upon receipt of the attestation from the user 110 (and from the other verified users), the IDP 102 determines, generally, whether to generate the digital identity for the target user 106 based on the received attestation(s) (e.g., the IDP 102 may determine a level of confidence for the digital identity based on the received attestations alongside any other means it has of performing assurance of the identity of the target user 106 (e.g., inquiries with other government agencies, etc.), etc.). This may be accomplished in a number of ways. In this exemplary embodiment, the IDP 102 determines, at 330, whether the number of received attestations is sufficient. For example, the IDP 102 may require a threshold number of attestations (e.g., five, ten, twenty five, or more or less, etc.). When the number of attestations is not sufficient (i.e., does not satisfy the threshold number), the IDP 102 transmits one or more additional attestation requests, at 316, to one more additional verified users (and the operations at 318-330 are repeated). Further, when the number of attestations is not sufficient and additional verified users are not available, the IDP 102 may end the process and notify the target user 106 at the communication device 104 that the request for the digital identity has failed. It should be appreciated that the number of attestations required by the IDP 102 (i.e., the threshold number) may be generic to the target user 106 or it may be specific to the particular identifying information (or amount of identifying information) requiring verification (e.g., a name, a phone number, etc.).

In one example, the attestation request (as sent to multiple verified users) includes a listing of identifying information, such as shown in FIG. 4, which includes five pieces of information. As the multiple attestation responses are received from the verified users (including the user 110), the IDP 102 maintains a ledger of the attestation responses and to which pieces of identifying information the attestation responses relate. As such, upon receipt of five attestation responses, the IDP 102 may have tabulated, in this example, that all five verified users attested to the name and the phone number of the target user 106, but that only four attested to the address and the email address of the target user 106 and that only one attested to the birthdate of the target user 106. In connection therewith, if the threshold number of attestation responses is five, the next attestation request may only include the address, the email and the birthdate for the target user 106, to be attested (e.g., the radio buttons for the other identifying information may be omitted in the interface 400, or the other identifying information may be omitted all together in the interface 400, etc.). Further, a later attestation request (to a seventh verified user) may then only include the birthdate to be attested. Alternatively, the IDP 102 may include all six of the pieces of identifying information in the subsequent attestation requests until attestations for each piece is satisfied (thereby providing enhanced confidence in the attestations above the threshold, for example).

In other embodiments, the IDP 102 may determine whether to generate the digital identity for the target user 106 based on a calculated level of confidence that the target user 106 is who they claim to be. This may be achieved by way of an assurance framework that specifies a type, veracity and volume of identifying information to be confirmed as well as a number of available verified user able to participate in such checks. In connection therewith, the framework may specify levels or thresholds of the identity verification process (which could start at none) and allowable combinations (for example, a passport checked or verified with the passport office could be equivalent to an identity attested by six verified users, or a library card checked or verified with a library could be equivalent to an identity attested by four verified users, etc.).

That said, in this example, when the IDP 102 determines, at 330, that a number of received attestation responses is sufficient (for the target user 106 or particular identifying information), the IDP 102 generates, at 332, a digital identity for the target user 106 (e.g., only when the number of received attestation responses satisfies a threshold, etc.). This may include compiling the identifying information for the target user 106 (as received from the target user 106 and/or as verified/attested to by the verified users) into the digital identity (e.g., in a data structure in memory, etc.) and associating the digital identity with an identifier particular to the target user 106, which may include a number, a key or a certificate specific to the digital identity and the target user 106. The digital identity generally includes all the identifying information known to the IDP 102, or at least the identifying information attested to by a sufficient number of verified users, and in some embodiments potentially identifying information not attested to by any verified user. This information may include, again, a name of the user 106, a mailing address, an email address, a phone number, a government ID number (e.g., a social security number, etc.), a birthdate, a birth place, a gender, an ethnicity, the selfie (broadly, the facial image), other biometrics, etc., and also information specific to the user's communication device 104, etc.

What's more, the digital identity may also include an assurance level (e.g., as generated by the IDP 102, etc.), which may be based on the type of verification of the identity of the target user 106. Often, in various embodiments, the assurance level for a user verified as described above, based on attestations of/by other verified users, will be lower or less than that for a user whose identity is verified by one or more physical documents, etc. For instance, the assurance level may be based on a set of rules against which the type, veracity and volume of checks (or attestations) is performed with respect to the identifying information of the target user 106 (as well as to what particular identifying information is attested to or verified). In so doing, a matrix of possible checks may be defined within the assurance framework discussed above, which allows the IDP 102, for instance, to provide a level of assurance in the verification, and through which the relying party 112 is able to gain confidence in the outcome, without need to be informed of how the verification of the user 106 was actually achieved.

Table 1 includes an example matrix that may be used, by the IDP 102, in connection with determining an assurance level for the target user 106 (and for thereby providing a level of confidence to the relying party 112 in the outcome of the IDP's analysis and decision as to whether or not to provide a digital identity to the target user 106). It should be appreciated that the matrix may also be employed by the IDP 102, in one or more embodiments, as a basis (at least in part) for determining whether to generate a digital identity for the target user 106 in the first place.

TABLE 1

| | Manner of Attribute Verification | | | | | |
|---|---|---|---|---|---|---|
| | Passport | Driver's License | Phone Bill | Marriage Certificate | Verified User | Attested User |
| Name | 10 | 10 | 6 | 7 | 3 | 1 |
| Address | 10 | 10 | 6 | 7 | 3 | 1 |
| Email | N/A | N/A | N/A | N/A | 2 | 1 |
| Passport ID | 10 | N/A | N/A | N/A | 1 | N/A |
| Driver's License Number | N/A | 10 | N/A | N/A | 1 | N/A |
| Date of Birth | 10 | 10 | N/A | 7 | 2 | 1 |
| Phone Number | N/A | N/A | 6 | N/A | 3 | 1 |
| Gender | 10 | 10 | N/A | N/A | 3 | 1 |
| Marital Status | N/A | N/A | N/A | 7 | 2 | 1 |
| ... | ... | ... | ... | ... | ... | ... |

As shown in Table 1, the illustrated matrix includes multiple identity attributes (e.g., name, address, email, etc.) and multiple manners of verifying the attributes (ranging from physical documents to attestations by different types of users). It should be appreciated that additional and/or different attributes may be included in the matrix in other embodiments. Additionally, it should also be appreciated that additional and/or different manners of verifying attributes may be included in the matrix in other embodiments.

In this example, scores (or points) are provided for each of the attributes and for each manner available for verifying the given attribute. In connection therewith, higher scores are generally associated with more reliable manners of verifying attributes. In Table 1, for instance, scores are provided on a scale of 1-10, where a score of 1 represents a less reliable manner of verifying a given attribute while a score of 10 represents a highly reliable manner of verifying a given attribute (and, where N/A indicates the manner of verification is not available or allowed for the given attribute). Rules may then be applied for distilling the scores from the matrix into an assurance level (e.g., the scores may be summed or otherwise combined for each attribute evaluated for the target user 106, one or more of the types of verification may be weighted, the scores (individually or in combination) may be compared to one or more thresholds, etc.). What's more, in some implementations of the matrix, the rules may further include certain limitations on total score values for one or more of the manners used to verify an attribute. For instance, a score representing verification of an attribute by a verified user (e.g., a user whose identity has previously been verified in a conventional manner through use of one or more physical documents, etc.) may be capped at a first value (e.g., 3, etc.), and a score representing verification of an attribute by an attested user (e.g., a user whose identity has previously been verified in accordance with the present disclosure by other verified users, etc.) verified user may be capped at another value (e.g., 1, etc.). And, a score representing verification of an attribute in a conventional manner, through use of one or more physical documents, may not be capped and/or may also include a weighting factor (e.g., a weighting factor of three, etc.).

With that said, in the above example, where the IDP 102 determines to generate a digital identity for the target user 106, based on the name, the address, the phone number, the email address, and the birthdate provided by the relying party 112 (as attested to by the verified user 110, and other verified users), the IDP 102 may generate an assurance level for the digital identity for the target user 106 by way of the matrix included in Table 1. For instance, the IDP 102 may receive attestations for each of the target user's name, address, phone number, email address, and birthdate from five verified users. In connection therewith, the IDP 102 may multiply the scores in Table 1 by the number of attestations for each of the attributes, whereby the IDP 102 may generate an assurance level of 65 for the digital identity of the target user 106 (e.g., on a scale of 1-100, where any generated assurance level of greater than 100 may be limited to 100; etc.).

As can be appreciated, in other examples, other combinations of the verification manners may be used by the IDP 102 to verify attributes of target users, including combinations of physical documents and attestations from verified (and/or attested) users. In that sense, the matrix included in Table 1 may be used to accommodate the different combinations, in connection with generating an assurance level for the digital identity generated by the IDP 102. For instance, the IDP 102 may verify the target user's name, address, and phone number by way of a phone bill provided by cellular service provider with which the target user 106 has an account (e.g., to the relying party 112, to the IDP 102, etc.). The IDP 102 may then receive attestations for the target user's email address and birthdate from five verified users. In connection therewith, the IDP 102 may then multiply the scores in Table 1 for name, address, and phone number by a weighting factor of 3, and the scores for email address and birthdate by the number of attestations for each (where the IDP 102 may receive attestations for each of these attributes from five users). As a result, the IDP 102 may generate an assurance level of 74 for the digital identity of the target user 106 (e.g., again on a scale of 1-100, etc.).

Thereafter, the IDP 102 transmits a digital identity notice to the target user 106, at 334, and in particular to the communication device 104. The notice includes, for example, at least the identifier specific to the digital identity of the target user 106 and, potentially, the assurance level. The notice may further include a summary or description or listing of the identifying information included in the digital identity. From there, the communication device 104 stores the identifier, whereby the target user 106 (now a verified user) is permitted to present the digital identity to the relying party 112 through the application 116 or otherwise (e.g., a token, etc.). In turn, the relying party 112 submits the identifier (e.g., or token, etc.) to the IDP 102, whereupon the IDP 102 shares the digital identity for the target user 106 (as linked to the identifier), or part thereof, with the relying party 112 (e.g., after authenticating the target user 106 at the communication device 104, via the application 116, etc.).

In view of the above, the systems and methods herein provide for provisioning digital identities to users based on attestations of identity attributes of the users from verified users (e.g., from a network of trusted users, as trusted by the IDP 102, etc.), in lieu of or in combination with verification by physical documents. In this way, a digital identity may be provisioned based on a network of trusted or verified users, instead of conventional physical documents, etc.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, a request for a digital identity from a communication device of a user, the request including identifying information for the user and at least one verified user identifier; (b) transmitting, by the computing device, to a communication device of a verified user associated with the at least one verified user identifier, an attestation request for the user, the attestation request including at least a portion of the identifying information for the user; (c) receiving, by the computing device, from the communication device of the verified user, an attestation in response to the attestation request, the attestation relating to the at least a portion of the identifying information for the user included in the attestation request; (d) generating a digital identity for the user, based on a number of attestations of the identifying information for the user; and (e) sharing a digital identity notice with the user, at the communication device of the user, the digital identify notice including an identifier for the user, whereby the user is permitted to share the digital identity with a relying party via the identifier.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in provisioning identity credentials to a user based on interactions with at least one verified user, the method comprising:
   receiving, by a computing device associated with an identity provider, a request for a digital identity from a communication device of a user, the request including identifying information for the user;
   transmitting, by the computing device, to each of multiple communication devices of verified users, an attestation request for the user, each of the attestation requests including at least a portion of the identifying information for the user, the attestation requests including a first attestation request and a second attestation request, wherein the at least a portion of the identifying information included in the first attestation request is different than the at least a portion of the identifying information included in the second attestation request;
   receiving, by the computing device, from ones of the multiple communication devices of the verified users, attestation responses to at least the first and second attestation requests, each of the attestation responses including an attestation of the respective at least a portion of the identifying information for the user included in said attestation request;
   determining, by the computing device, whether a number of the attestation responses satisfies an attestation threshold;
   in response to determining that the number of the attestation responses satisfies the attestation threshold, generating the digital identity for the user, which includes the at least a portion of the identifying information attested to by the verified users; and
   sharing a digital identity notice with the user, at the communication device of the user, the digital identity notice including an identifier for the user, whereby the user is permitted to share the digital identity with a relying party via the identifier.

2. The computer-implemented method of claim 1, wherein the identifying information received from the user in the request includes a facial image of the user; and
   wherein the at least a portion of the identifying information included in the first attestation request includes the facial image of the user to be displayed to the verified users.

3. The computer-implemented method of claim 1, further comprising:
   in response to determining that the number of attestation responses does not satisfy the attestation threshold, transmitting an additional attestation request to at least one additional verified user; and later
   determining, by the computing device, that the number of the attestation responses satisfies the attestation threshold; and
   wherein the digital identity generated for the user includes the at least a portion of the identifying information attested to by the verified users and the at least one additional user.

4. The computer-implemented method of claim 1, wherein generating the digital identity further includes:
   compiling, into the digital identity, the at least a portion of the identifying information attested to by the verified users; and
   associating the digital identity with the identifier of the user.

5. The computer-implemented method of claim 1, wherein the attestation response to the first attestation request includes an attestation of a first part of the at least a portion of the identifying information for the user included in the first attestation request, but not an attestation of a second part of the at least a portion of the identifying information included in the first attestation request.

6. The computer-implemented method of claim 5, further comprising:
   in response to determining that the number of attestation responses attesting to the second part of the at least a portion of the identifying information included in the first attestation request does not satisfy the attestation threshold, transmitting an additional attestation request to at least one additional verified user, the additional attestation request includes the second part of the at least a portion of the identifying information included in the first attestation request; and later
   determining, by the computing device, that a number of the attestation responses attesting to the second part of the at least a portion of the identifying information included in the first attestation request satisfies the attestation threshold; and
   further generating the digital identity for the user to include the second part of the at least a portion of the identifying information included in the first attestation request.

7. The computer-implemented method of claim 6, wherein the second part of the at least a portion of the identifying information included in the first attestation request includes at least one of: a government identifier and a birthdate of the user.

8. The computer-implemented method of claim 5, wherein determining, by the computing device, whether the number of the attestation responses satisfies the attestation threshold includes determining, by the computing device, for the first part of the at least a portion of the identifying information included in the first attestation request, whether a number of the attestation responses attesting to the first part of the at least a portion of the identifying information included in the first attestation request satisfies the attestation threshold; and wherein generating the digital identity includes generating the digital identity to include the first part of the at least a portion of the identifying information included in the first attestation request, in response to the number of the attestation responses attesting to the first part of the at least a portion of the identifying included in the first satisfying the attestation threshold.

9. The computer-implemented method of claim 8, wherein the first part of the at least a portion of the identifying information included in the first attestation request includes at least one of: a mailing address, a phone number, and an email address of the user.

10. The computer-implemented method of claim 1, wherein the at least a portion of the identifying information included in the first attestation request partially overlaps with the at least a portion of the identifying information included in the second attestation requests.

11. A computer-implemented method for use in provisioning identity credentials to a user based on interactions with at least one verified user, the method comprising:

receiving, by a computing device associated with an identity provider, a request for a digital identity from a communication device of a user, the request including identifying information for the user and at least one verified user identifier, the identifying information for the user including a facial image of the user;

transmitting, by the computing device, to a communication device of a verified user associated with the at least one verified user identifier, an attestation request for the user, the attestation request including at least a portion of the identifying information for the user, and wherein the at least a portion of the identifying information includes the facial image of the user;

receiving, by the computing device, from the communication device of the verified user, an attestation response to the attestation request, the attestation response including an attestation of a first part of the at least a portion of the identifying information for the user included in the attestation request, but not a second part of the at least a portion of the identifying information for the user included in the attestation request;

generating the digital identity for the user, which includes the attested first part of the at least a portion of the identifying information for the user based on the attestation response, but not the second part of the at least a portion of the identifying information for the user included in the attestation request; and sharing a digital identity notice with the user, at the communication device of the user, the digital identity notice including an identifier for the user, whereby the user is permitted to share the digital identity with a relying party via the identifier.

12. The computer-implemented method of claim 11, wherein generating the digital identity further includes:

compiling, into the digital identity, the identifying information received from the user in the request and/or the at least a portion of the identifying information attested to by the verified user; and associating the digital identity with the identifier.

13. The computer-implemented method of claim 11, wherein transmitting the attestation request to the communication device of the verified user includes transmitting the attestation request to multiple communication devices each associated with one of multiple verified users; and wherein receiving the attestation includes receiving the attestation from ones of the multiple verified users.

14. The computer-implemented method of claim 11, wherein the identifying information for the user includes at least one of: an email address, a mailing address, and a phone number.

15. The computer-implemented method of claim 11, wherein the at least a portion of the identifying information for the user included in the attestation request includes a phone number, but not a government identifier.

16. A computer-implemented method for use in provisioning identity credentials to a user based on interactions with at least one verified user, the method comprising:

receiving, by a computing device associated with an identity provider, a request for a digital identity from a communication device of a user, the request including identifying information for the user and at least one verified user identifier, the identifying information for the user including a facial image of the user;

transmitting, by the computing device, to a communication device of a verified user associated with the at least one verified user identifier, an attestation request for the user, the attestation request including at least a portion of the identifying information for the user, and wherein the at least a portion of the identifying information includes the facial image of the user;

receiving, by the computing device, from the communication device of the verified user, an attestation response to the attestation request, the attestation response including an attestation of a first part of the at least a portion of the identifying information for the user included in the attestation request;

determining whether a number of attestations of the identifying information for the user exceeds an attestation threshold; and then, transmitting an additional attestation request to at least one additional verified user, in response to the number of attestations not satisfying the attestation threshold, wherein the additional attestation request includes at least another portion of the identifying information for the user;

receiving, by the computing device, from a communication device of the at least one verified user, an additional attestation response to the additional attestation request, the additional attestation response including an attestation of the at least another portion of the identifying information for the user, wherein said at least a portion of the identifying information for the user partially overlaps the at least another portion of the identifying information for the user;

generating the digital identity for the user, which includes the attested first part of the at least a portion of the identifying information for the user and the at least another portion of the identifying information for the user, based on the attestation response and the additional attestation response; and sharing a digital identity notice with the user, at the communication device of the user, the digital identity notice including an identifier for the user, whereby the user is permitted to share the digital identity with a relying party via the identifier.

17. The computer-implemented method of claim 16, wherein the at least a portion of the identifying information for the user includes at least one of: an email address, a mailing address, and a phone number.

18. The computer-implemented method of claim 16, wherein the at least another portion of the identifying information for the user includes a government identifier.

19. The computer-implemented method of claim 16, wherein the at least one verified user identifier includes multiple verified user identifiers for multiple verified users; and wherein the attestation response includes multiple attestation responses from the multiple verified users.

* * * * *